United States Patent
Hecht (10) Patent No.: US 11,352,540 B2
(45) Date of Patent: Jun. 7, 2022

(54) DISSOLVABLE FRACKING PLUG ASSEMBLY

(71) Applicant: Wyoming Completion Technologies, Inc., Powell, WY (US)

(72) Inventor: Scott J. Hecht, Powell, WY (US)

(73) Assignee: Wyoming Completion Technologies, Inc., Powell, WY (US)

( * ) Notice: Subject to any disclaimer, the term of this patent is extended or adjusted under 35 U.S.C. 154(b) by 8 days.

(21) Appl. No.: 16/845,961

(22) Filed: Apr. 10, 2020

(65) Prior Publication Data

US 2020/0332171 A1 Oct. 22, 2020

Related U.S. Application Data

(60) Provisional application No. 62/834,560, filed on Apr. 16, 2019.

(51) Int. Cl.
| | | |
|---|---|---|
| *E21B 23/04* | (2006.01) | |
| *E21B 29/02* | (2006.01) | |
| *E21B 23/06* | (2006.01) | |
| *E21B 33/128* | (2006.01) | |
| *C09K 8/42* | (2006.01) | |
| *E21B 33/129* | (2006.01) | |
| *E21B 43/26* | (2006.01) | |

(52) U.S. Cl.
CPC .......... *C09K 8/426* (2013.01); *E21B 23/0413* (2020.05); *E21B 23/06* (2013.01); *E21B 29/02* (2013.01); *E21B 33/128* (2013.01); *E21B 33/129* (2013.01); *E21B 43/26* (2013.01)

(58) Field of Classification Search
CPC ........ E21B 33/128; E21B 29/02; E21B 23/06; E21B 23/0413; E21B 23/04
See application file for complete search history.

(56) References Cited

U.S. PATENT DOCUMENTS

| | | | | |
|---|---|---|---|---|
| 5,485,882 A | * | 1/1996 | Bailey | E21B 33/138 166/193 |
| 8,579,023 B1 | * | 11/2013 | Nish | E21B 33/128 166/134 |
| 9,500,061 B2 | * | 11/2016 | Frazier | E21B 33/1293 |
| 9,828,827 B2 | * | 11/2017 | Kellner | E21B 33/129 |
| 9,915,114 B2 | * | 3/2018 | Greenlee | E21B 23/06 |
| 10,337,279 B2 | * | 7/2019 | Frazier | E21B 34/063 |

(Continued)

OTHER PUBLICATIONS https://www.klxenergy.com/DownlGads/KLX-Standard-Dissolvable-Spec-Sheet.pdf; https://www.klxenergy.com/Downloads/KLX-Rapid-Dissolvable-Spec-Sheet.pdf; https://www.kixenergy.com/Downloads/KLX-BIP-Dissolvable-Spec-Sheet.pdf; date of publication: unknown.

(Continued)

*Primary Examiner* — Catherine Loikith
(74) *Attorney, Agent, or Firm* — Avek IP, LLC; William B. Kircher (57) ABSTRACT

A hydraulic fracking plug assembly comprises a mandrel, sealing element, upper and lower backup rings, upper and lower cones, upper and lower slips each having teeth configured to engage a well casing, and a shoe. At least one of these parts, and in a further example most or all of these parts, are soluble in a solvent such as a potassium chloride solution, an acid, or a base. In some such examples, the soluble parts comprise magnesium, a magnesium alloy, or a soluble polymer.

29 Claims, 6 Drawing Sheets

(56) References Cited

U.S. PATENT DOCUMENTS

| | | | |
|---|---|---|---|
| 2014/0262214 A1* | 9/2014 | Mhaskar | E21B 33/1291 166/216 |
| 2016/0230498 A1* | 8/2016 | Walton | C09K 8/428 |
| 2016/0257786 A1* | 9/2016 | Fripp | E21B 43/26 |
| 2017/0370176 A1* | 12/2017 | Frazier | E21B 33/1291 |

OTHER PUBLICATIONS https://www.halliburton.com/content/dam/ps/public/tttcp/contents/Data_Sheets/web/H/illusion-he-dissolvable-frac-plug-h013128.pdf?nav=en-US_service-tools_public; https://www.halliburton.com/content/dam/ps/pubiic/cps/contents/Data_Sheets/web/H/lllusion-SDS.pdf?nav=en-US_service-tools_public; date of publication: unknown.
https://nineenergyservice.com/assets/files/Magnum-Vanishing-Plug-High-Temp.pdf; date of publication: unknown.
https://innovex-inc.com/wp-content/uploads/2018/07/lnnovex_Swage-Dissolvable-Frac-Plug.pcif; date of publication unknown.
https://www.slb.com/-/media/files/co/product-sheet/reacxion-complete-ps.ashx; https://www.slb.com/-/media/files/co/product-sheet/fracxion-micro-ps.ashx; date of publication: unknown.

\* cited by examiner

DISSOLVABLE FRACKING PLUG ASSEMBLY

CROSS-REFERENCE TO RELATED APPLICATIONS

The present applications claims priority to the earlier filed provisional application having Ser. No. 62/834,560 and hereby incorporates the subject matter of the provisional in its entirety.

FIELD

The invention relates generally to fracking technology, and more particularly to a dissolvable fracking plug assembly.

BACKGROUND

Oil is a primary source of energy for much of the world, and is the raw material from which many plastics, pharmaceuticals, and other products are made. The transportation industry and heating in particular rely almost exclusively on gasoline, kerosene, natural gas, and other products derived from oil drilling. Oil is typically found in pockets or reservoirs in the ground where remains of prehistoric plants and animals have decomposed in the absence of oxygen to form carbon-rich organic compounds that with heat and pressure over time became products such as crude oil and natural gas. These products tend to accumulate in porous limestone or sandstone, but can also be found in shale where such accumulation has not happened or is incomplete.

Geologists search for oil by using seismology and other methods to look for accumulations of oil in such pockets, or by looking for shale deposits likely to have high oil content. Once an area of interest is found, a well is drilled such as by using a large bit to bore a hole through rock and sediment while water or other material is circulated through the drill pipe and out the bored hole to clear the hole of drilled debris. A casing or large diameter pipe is then placed in the bored hole to stabilize the hole, and cement is pumped between the casing and the bored hole to stabilize the bored hole.

When a bore hole is complete, a perforating gun is typically lowered to a point at which oil is believed to be present, and explosive charges create holes in the casing through which oil and gas can flow. The perforated casing typically will not result in a "gusher" of oil as is popularly seen on television and in the movies, but may require acid etching, pressurized steam, hydraulic fracturing, or other treatment of the geology surrounding the perforated area of the bore hole casing to result in oil flow. A pump coupled to the bore hole at the ground surface is typically employed to create suction in the bore hole to extract oil and gas from the bored hole.

Where oil and gas have not yet accumulated in large reservoirs but are still trapped in shale formations, a process known as fracking or hydraulic fracturing is used to create fractures in the shale surrounding the perforations in the casing before trying to extract oil or gas. Because a bore hole may run thousands of feet, especially for horizontal drilling, it is often desirable to perform this fracturing process at intervals along the bore casing to better harvest oil and gas from a large area along the bore hole. To do this, a type of fracking called plug-and-perf is employed, in which a segment of the bore hole is perforated before a fracking fluid is pumped in under high pressure to fracture the surrounding rock, that segment is plugged or isolated, and the next segment is perforated and fractured. This process is repeated until the entire region of interest is perforated and fractured, and the plugs used as part of the process are drilled out.

But, the plugs used for this plug-and-perf fracking process must be able to withstand the pressure of fracking fluid, which can often exceed 10,000 psi, without moving within the bore hole, while being soft enough to be drilled out after the fracking process is complete so that oil and gas can be extracted. Plugs currently used in plug-and-perf fracking often take more than a half hour to drill out per plug, and can be difficult to drill out if various complications arise, such as if they become dislodged or spin during the drilling process. For these and other reasons, an improved plug is desired.

SUMMARY

One example embodiment of the invention comprises a hydraulic fracking plug assembly having a mandrel, sealing element, upper and lower backup rings, upper and lower cones, upper and lower slips each having teeth configured to engage a well casing, and a shoe. At least one of these parts, and in a further example most or all of these parts, are soluble in a solvent such as a potassium chloride solution, an acid, or a base. In some such examples, the soluble parts comprise magnesium, a magnesium alloy, or a soluble polymer.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

Oil drilling is becoming increasingly difficult, as much of the oil that is the easiest to extract has already been located and extracted. Complex drilling techniques, such as horizontal drilling, hydraulic fracturing (or fracking), and the like have therefore become commonplace in oil fields around the world. Further, the depth of such wells is becoming increasingly deeper to reach yet untapped oil reserves, with horizontal wells extending 5,000 feet to 10,000 feet or more being common. For example, many horizontal wells now extend well beyond 5,000 feet through oil shale, which must be hydraulically fractured or fracked to free the oil from the many pockets in the shale formation.

A typical well is drilled such as by using a large bit, such as from 5-10 inches in diameter, to bore a hole through rock and sediment while water or other liquid is circulated through a drill pipe and out the bored hole to clear the hole of drilled debris. A casing or large diameter pipe is then placed in the bored hole to stabilize the hole, and cement is pumped between the casing and the bored hole to stabilize the casing in the bored hole. The completed hole is then prepared for fracking by lowering a perforating gun in the casing and using explosive charges to crate holes in the casing through which fracking fluid can be pumped to create a passage between pockets of oil and gas in the shale formation and the casing. In deep bore holes, the perforating and fracking process is often repeated many times over the length of the bore hole, and plugs are used to seal completed deeper portions of the bore hole while subsequently fracking shallower regions. This process is often called plug-and-perf fracking, because a plug separates portions of the bore hole that have already been perforated and hydraulically fractured from the portion currently being perforated and fractured.

Once the plug-and-perf process is complete, the plugs are all drilled from the bore hole so oil and gas can be extracted. Because the plugs must be able to hold their position within the casing under the pressure of fracking fluid, which can exceed 10,000 psi, they are often difficult to drill out so that oil and gas can be extracted after the fracking process is complete. Further, as bore holes extend many thousands of feet deep, the plugs become increasingly difficult to drill out from the surface, often taking half an hour or more per plug if no problems arise. If the plugs become dislodged or spin during the drilling process, plugs may take many hours to drill out or not be drilled out at all.

For reasons such as these, some example embodiments of the invention presented herein comprise a fracking plug that is at least partially soluble in a solvent, such that the plug can be either entirely dissolved or freed from the casing sufficiently to be moved or removed. In a further embodiment, the soluble part of the plug comprises magnesium or a magnesium alloy, which is soluble in a potassium chloride solvent solution. In another example, the plug contains a sealing element such as a rubber or polymer that is similarly soluble in a potassium chloride solvent solution. In other examples, the plug or at least part of the plug are soluble in an acid or in a base solvent.

Figure 1:
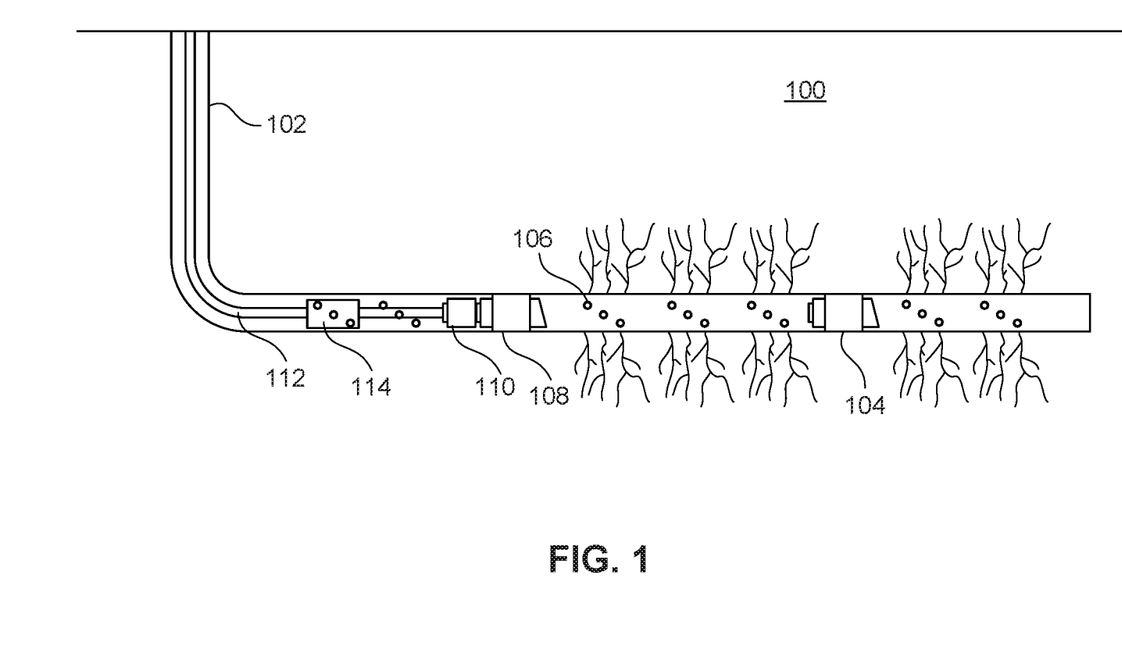
FIG. 1 shows a horizontal plug-and-perf frack oil well, consistent with an example embodiment.

FIG. 1 shows a horizontal plug-and-perf frack oil well, consistent with an example embodiment. Here, a bore hole is formed in the ground 100, and a casing 102 is inserted into the bore hole. The casing is fixed within the hole by pumping a cement mixture between the casing and the bore hole, fixing the casing's position within the bore hole. One or more plugs 104 are inserted into the casing such that the plug seals against the casing, and perforations 106 are formed in the casing between the plug and the ground end of the casing.

In the simplified example shown in FIG. 1, one plug is already in place, and a second plug 108 is being set by plug set tool 110. The plug set tool is affixed at the end of a wireline or coiled tubing 112, allowing insertion, extraction, and operation of the plug set tool from above ground. The wireline or coiled tubing also supports a perf gun 114, operable to use an explosive charge to produce perforations in the casing as shown at 106.

Figure 2:
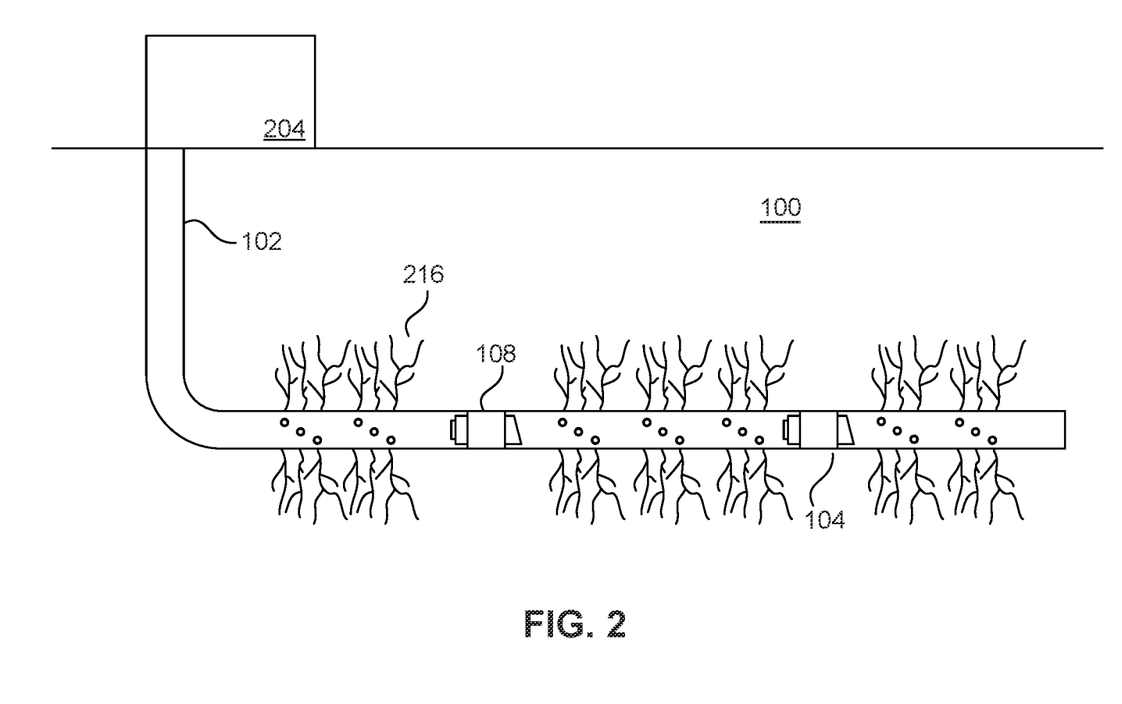
FIG. 2 shows hydraulic fracturing of rock in a plug-and-perf frack oil well, consistent with an example embodiment.

FIG. 2 shows hydraulic fracturing of rock in a plug-and-perf frack oil well, consistent with an example embodiment. Here, the well of FIG. 1 has its wireline 112, perf gun 114, and frac plug setting tool 110 removed from the casing as shown at 102, and a pump 204 is attached to the casing at the head of the well. The pump supplies fracking fluid into the casing at high pressure, such as 8,000-10,000 psi, such that the fracking fluid flows out the perforations under high pressure and causes hydraulic fractures 216 in the rock surrounding the perforated portions of the casing. Plug 108 prevents the hydraulic fracking fluid from flowing to perforated portions of the bore hole through which hydraulic fracturing has already taken place, focusing the fluid pressure on the limited number of newly-formed fractures 216. The fracking fluid in a further example includes a proppant, such as fracking sand, designed to keep the fractures 216 formed in the surrounding rock formations open to the flow of oil and gas once the rock has been fractured but hydraulic fracking fluid pressure has been removed.

Figure 3:
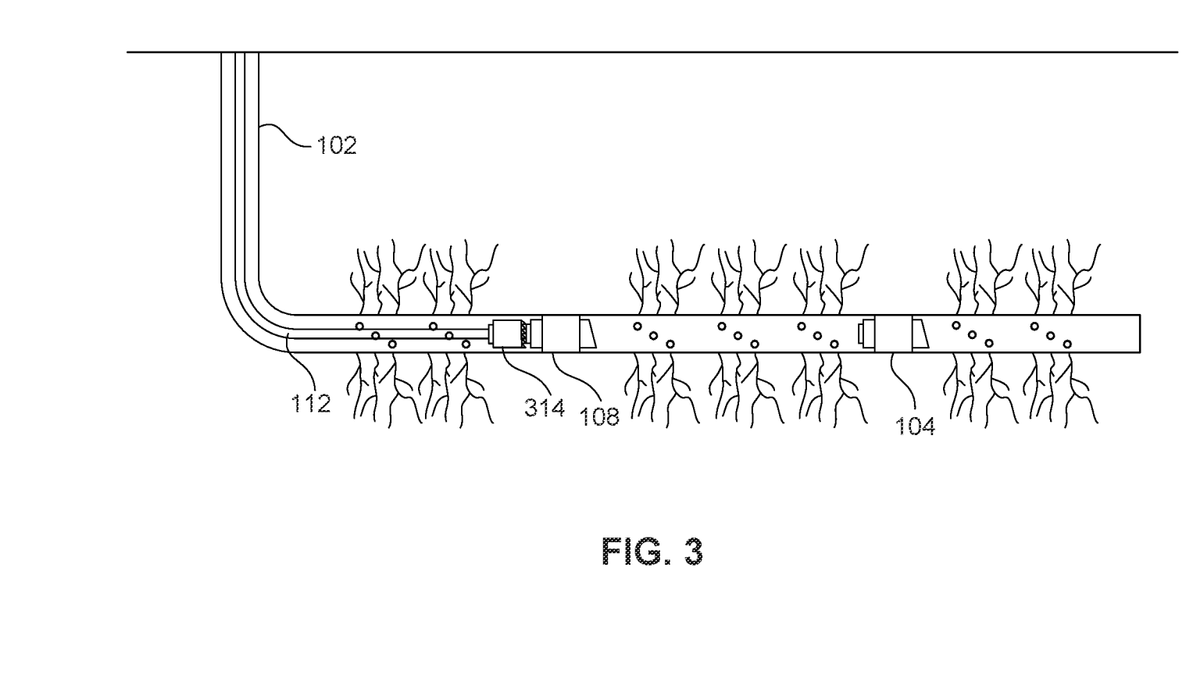
FIG. 3 shows removal of frac plugs from a plug-and-perf frack oil well, consistent with an example embodiment.

FIG. 3 shows removal of frac plugs 104 and 108 from a plug-and-perf frack oil well, consistent with an example embodiment. Once the desired regions of the casing 102 along which oil is believed to be present have been hydraulically fractured, the plugs 104 and 108 must be drilled out or otherwise removed to enable oil and gas to be pumped from the fractured rock formations surrounding the casing to the surface of the oil well. In this example, wireline or coiled tubing 112 feeds a drill head 314 down to the fracking plug 108 and rotates the drill head to bore out the fracking plug. The drill head then progresses to the next plug 104, continuing for as many plugs are in the well.

But, while use of a drill head 314 works fairly well near the surface of the oil well where the wireline or coiled tubing distance to the drill head is fairly short, it works progressively less reliably as the distance underground to the drill head increases. In some embodiments of the invention, the drill head 314 is therefore replaced with or supplemented by a solvent that is designed to dissolve at least part of fracking plugs 108 and 104, either dislodging the plugs from the casing 102, breaking the plugs up into smaller pieces that can be easily cleared from the bore hole, or dissolving substantially all of the plugs.

Figure 4:
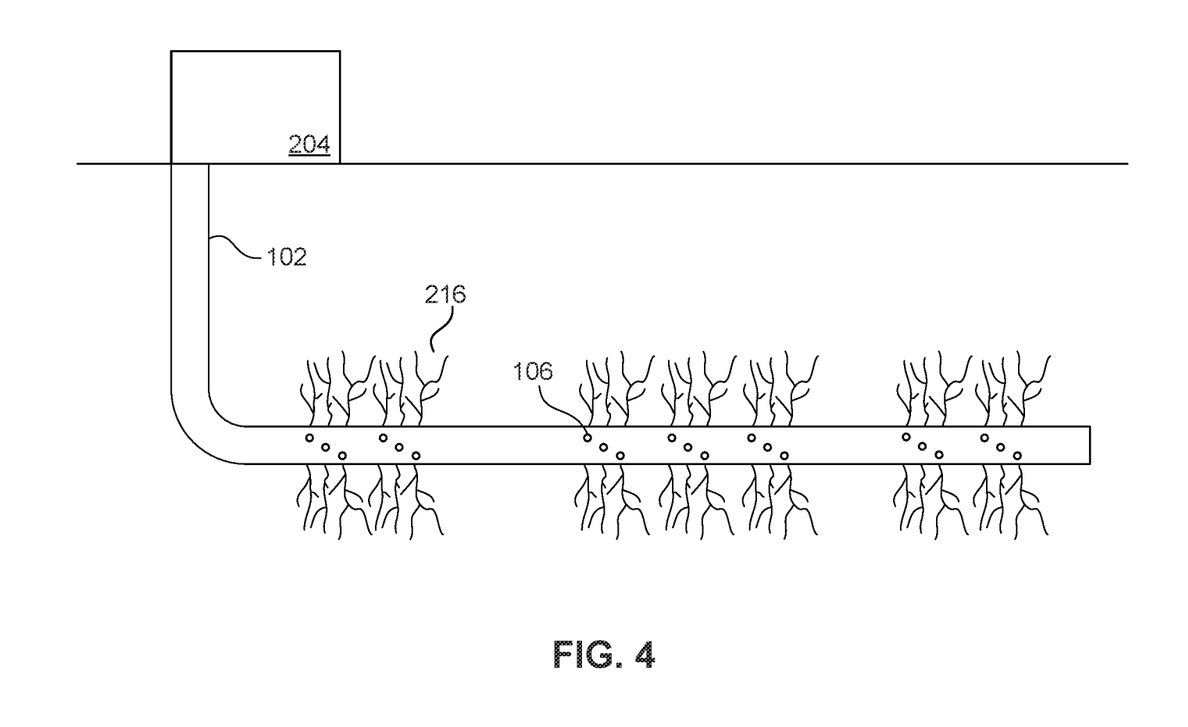
FIG. 4 shows a completed plug-and-perf frack oil well ready for oil and gas extraction, consistent with an example embodiment.

FIG. 4 shows a completed plug-and-perf frack oil well ready for oil and gas extraction, consistent with an example embodiment. Here, pressure in the oil and gas pockets in the fractured rock formations 216 caused by forces such as water pressure, dissolved gas, and pump 204 cause the oil and gas in the rock formations to be extracted to the surface of the well. In further examples, fluid or steam injection near the rock formations or other such mechanisms are used to enhance pressure in the rock formations and/or make the oil and gas in the rock formations more mobile, making oil and gas extraction easier.

Figure 5:
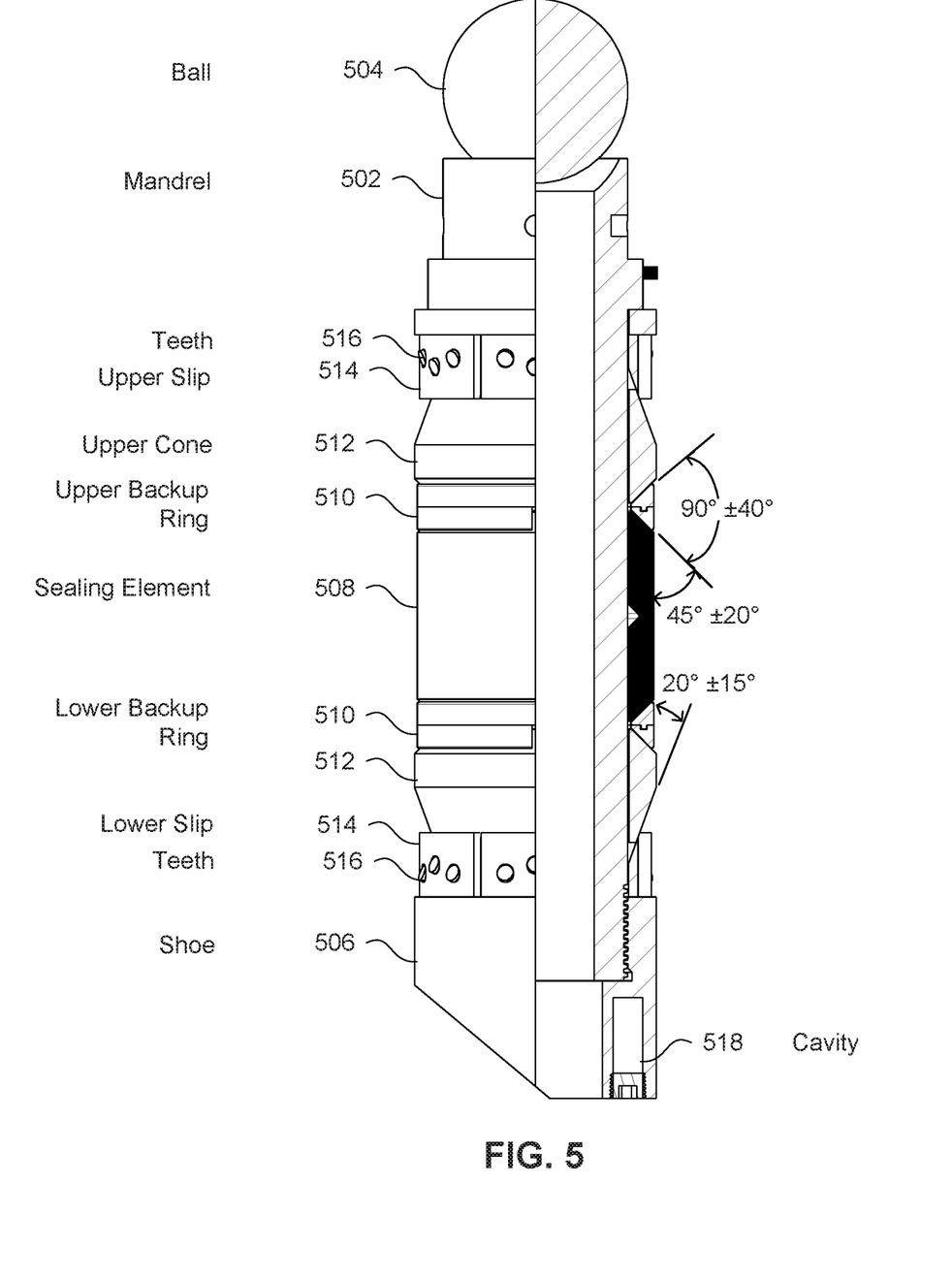
FIG. 5 shows a dissolvable frac plug, consistent with some example embodiments.

FIG. 5 shows a dissolvable frac plug, consistent with some example embodiments. Here, the plug assembly comprises a mandrel 502, which is the core structure upon which the frac plug is assembled. The mandrel in this example has a cylindrical hole extending from top to bottom through its center, such that fluid can flow through the mandrel unless a ball 504 is positioned in a ball seat at the top of the mandrel. The mandrel is configured to receive a shoe 506, which here is screwed on to the mandrel to capture several other components along the body of the mandrel. The mandrel in this example has a cylindrical outer surface configure to receive the several other components, but in other examples the outer surface will be a polygon such as a hexagon or octagon, or another regular shape configured to receive the several other components.

These components include a sealing element 508, which in this example is made of a potassium chloride-soluble rubber or composite material that is flexible enough to flex and seal against the wall of the oil well's casing but resilient enough to withstand hydraulic pressure in the thousands to tens of thousands of pounds per square inch and still seal properly. In other examples, the sealing element 508 is soluble in an acid or a base solvent, is made of a metallic or semi-metallic compound, or is a fiber-reinforced polymer. The sealing element in this example has a groove in its center as shown, but in other examples does not have a groove or has multiple grooves. The grooves in some such examples are configured to control the amount of flex in the sealing element, to control the region in which the sealing element flexes, or to control both the amount and region of flex.

The sealing element 508 abuts against upper and lower backup rings 510, which are tapered on each side to mate with tapers on the sealing element and on adjacent upper and lower cones 512. The angle between the two tapered sides of the upper and lower backup rings is 90° in this example, but in other examples is any one of the angles between 50° and 130°. In still further examples, the angle is between 60 and 120°, between 70° and 110° between 80° and 100°, or any angle less than 170°. In some examples, the angles on each side of the upper and lower backup rings are not symmetrical, such as where the angle formed where the backup rings abut the sealing element is different from the angle where the backup rings abut the upper and lower cones 512.

The upper and lower backup rings 510 are in this example made of magnesium or a magnesium alloy, while in other examples they are made of polymer, fiber-reinforced polymer, or other materials. The backup ring material in this example is soluble in a potassium chloride solution, while in other examples it is soluble in an acid, in a base, or in another solvent. In some examples, the upper and lower backup rings are semi-flexible such that they can expand slightly to provide a secondary or backup sealing function when seated against the casing of the oil well.

The upper and lower cones 512 abut against the upper and lower backup rings 510 respectively, and are angled where they abut the backup rings at an angle such that their angled surfaces are in contact when they abut. In a further example, the angles of the surfaces of abutting elements such as the backup rings and cones or the backup rings and sealing elements may be selected that they are slightly off from one another when not under pressure, but are more nearly parallel and in contact with one another when forced together when the plug is sealed against a casing.

The upper and lower cones 512 also abut the upper and lower slips 514, and are angled at an angle of 20° in this example where the cones contact the upper and lower slips. The upper and lower slips further have a series of teeth 516 spaced around the circumference of the slips, operable to bite into the casing of a well to resist movement when flared out by being pressed against the angled upper and lower cones. In further examples, the angle is between 5 and 35 degrees, between 10 and 30 degrees, between 15 and 25 degrees, or any angle greater than 3°.

The upper and lower cones in this example are made of a rigid metal such as steel, but in other examples comprise a material such as magnesium or a magnesium alloy that is soluble in a solvent such as a potassium chloride solution, or in alternate examples soluble in other solvents such as an acid or base solution. In further examples, the upper and lower cones are made of polymer, fiber-reinforced polymer, or other materials. In some examples, the upper and lower cones are more rigid than the upper and lower slips, such that the upper and lower slips deform when forced against the upper and lower cones, thereby forcing the teeth of the upper and lower cones into the casing of the oil well when the plug is installed.

In the example of FIG. 5, an additional cavity 518 is shown, which is filled with a solvent and capped with a plug just prior to installation of the plug in the well casing. In an alternate embodiment, the cavity is not filled with solvent but is left empty, and the plug is configured to quickly give way when exposed to a solvent, thereby increasing the surface area of the mandrel's shoe that is exposed to the solvent. This facilitates more rapid dissolving of the shoe in the solvent. In alternate examples, one or more other cavities, grooves, or other such features are incorporated into the shoe and/or the mandrel to increase the surface area exposed to solvent during the dissolving process, thereby reducing the time needed to dissolve the plug assembly. Soluble in various embodiments means that a 1 cm round ball will dissolve in a half hour, an hour, three hours, six hours, twelve hours, or a day.

The plug of FIG. 5 is assembled by sliding each of the upper and lower slips 514, upper and lower cones 512, upper and lower backup rings 510, and the sealing element 508 onto the outer circumference of the mandrel 502, and fastening them in place by threading on shoe 506. Although the shoe 506 is in this example threaded onto the mandrel, in other examples the shoe is pinned in place on the mandrel or is integral with the mandrel. When the plug is inserted into the well casing, the shoe end of the plug is inserted first, and the installation tool is operable to affix to the mandrel to guide the mandrel into the desired position for installation in the well casing. Once the desired location in the well casing is reached, the tool applies pressure to the upper slip in a downward direction as portrayed in FIG. 5, causing the upper and lower slips 514, upper and lower cones 512, upper and lower backup rings 510, and the sealing element 508 to compress against one another, such that the sealing element and upper and lower slips expand against the wall of the casing. A plug setting tool holds the plug in place such as by locking onto the mandrel while applying pressure to the upper slip during this installation or setting process, breaking away from the plug assembly by breaking the mechanical bond to the mandrel once a desired mechanical force between the mandrel and the upper slip is reached.

The sealing element 508, and in a further example upper and lower backup rings 510, seal against the wall of the casing, preventing hydraulic fracturing fluid (fracking fluid) under high pressure in the range of 8,000-10,000 psi from flowing around the plug, while the upper and lower slips bite into the casing. More particularly, the teeth of the lower slip bite into the casing, locking the plug in place so that it does not advance further down the oil well, while the teeth of the upper slip lock into the casing preventing the upper slip from moving back toward the upper end of the plug once the plug is set in place. Because each slip's teeth prevent movement of the slip in the direction of the end of the plug in which they are installed, the teeth serve to hold the upper and lower slips 514, upper and lower cones 512, upper and lower backup rings 510, and the sealing element 508 in their compressed position once the plug is set.

Ball 504 is then fed into position before hydraulic fracturing fluid is applied, sealing the inner mandrel opening from the hydraulic fracking fluid. The ball in one example is dropped down the well hole after the fracking plug is set, and in another example is carried down the bore hole with the setting tool used to set the fracking plug. The fracking operation then proceeds as described in FIGS. 1-4, and upon completion, the plugs are removed, partially dissolved, or are dislodged from their positions in the casing by use of a solvent such as potassium chloride, an acid, or a base, acting on at least one component of the plug assembly.

In an alternate embodiment, the plug of FIG. 5 is a bridge plug rather than a fracking plug, and the ball 504 is not present. In a bridge plug, the top of the mandrel 502 does not have an opening that requires a ball to seal against pressure, but is sealed as constructed and must be bored out, dissolved, or otherwise removed before fluid can flow past the plug.

Figure 6:
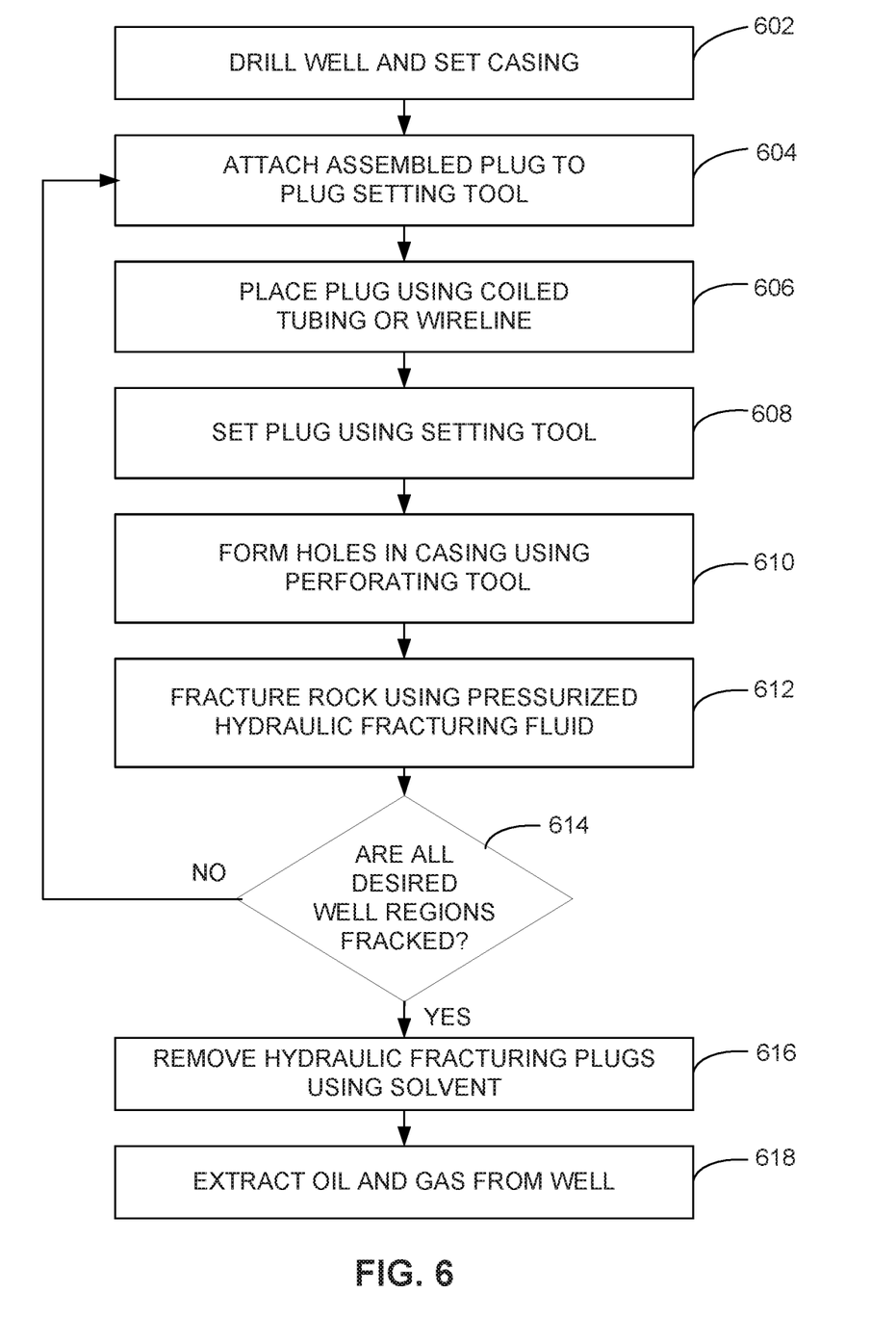
FIG. 6 is a flowchart, illustrating a method of using a dissolvable fracking plug in a plug-and-perf completion process in an oil well.

FIG. 6 is a flowchart, illustrating a method of using a dissolvable fracking plug in a plug-and-perf completion process in an oil well. At 602, the oil well is drilled and a casing is inserted into the bore hole and cemented in place. A fracking plug is prepared for insertion into the casing at 604, including assembling the plug if needed, and attaching the assembled plug to a setting tool attached to a wireline or coiled tubing. The plug is lowered into position in the casing using the coiled tubing or wireline at 606, and is set using the setting tool at 608. At 610, a perforating tool is used to form holes in the casing between the set plug and the oil well head, and the wireline or coiled tubing is removed.

Rock formations surrounding the perforated portions of the casing are then hydraulically fractured or fracked at 612, by pumping hydraulic fracturing fluid at high pressure down the oil well. At 614, the driller determines whether all desired regions of the well have been perforated and hydraulically fractured (fracked), and the process repeats for the next segment of the well at 604 if additional regions remain to be fracked. If the perforating and hydraulic fracturing process is determined to be complete at 614, the hydraulic fracturing plugs are removed or dislodged from the places in the casing at 616 using a solvent that dissolves part or all of the plugs. The oil well is then ready for extracting oil or gas at 618.

The examples presented here illustrate how a hydraulic fracturing (fracking) plug for plug-and-perf oil and gas drilling applications can be formed at least partially from a material that is dissolvable or soluble in a solvent such as a potassium chloride or other solution, facilitating easier and more certain removal of the fracking plug after the fracking process is complete. Further, dissolvable plugs such as those described here enable plug-and-perf fracking in wells that are deeper than can be currently employed due to the limitations of the traditional drilling process used to remove fracking plugs.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A hydraulic fracking plug assembly, comprising:
a mandrel comprising a body having an outer cylindrical surface and an inner surface, the inner surface forming an opening in the mandrel body approximately parallel to an axis of the outer cylindrical surface, the mandrel having an axis in the direction of the outer cylindrical surface's axis;
a sealing element comprising a flexible material having a cylindrical inner surface, installed along the outer cylindrical surface of the mandrel, and configured to seal the mandrel against a casing when force is applied to the sealing element in the direction of the mandrel's axis;
an upper backup ring and a lower backup ring each comprising a semi-rigid or rigid material configured to having a cylindrical inner surface, and each installed along the outer cylindrical surface of the mandrel such that the upper backup ring is in contact with an upper surface of the sealing element and the lower backup ring is in contact with a lower surface of the sealing element;
an upper cone and a lower cone each comprising a rigid material, each having a cylindrical inner surface, and each installed along the outer cylindrical surface of the mandrel such that the upper cone is in in contact with the upper backup ring and the lower cone is in contact with the lower backup ring, each of the upper and lower cones comprising a ramp portion angled between five and forty degrees from the mandrel's axis;
an upper slip and a lower slip each comprising a semi-rigid or rigid material, each having a cylindrical inner surface, and each installed along the outer cylindrical surface of the mandrel such that the upper slip is adjacent to and in contact with the ramp portion of the upper cone and the lower slip is adjacent to and in contact with the ramp portion of the lower cone, each slip further comprising a plurality of teeth configured to bite into the casing when the slip is forced outward from the mandrel's axis, each slip operable to expand and be forced outward from the mandrel's axis when forced against the ramp portion of the adjacent cone; and;
a shoe configured to capture one or more of the sealing element, upper ring and lower ring, upper cone and lower cone, and upper slip and lower slip on the mandrel, the shoe having a cavity formed therein and capped with a cavity plug;
wherein the shoe and one or more of the mandrel, sealing element, slips, cones and backup rings are soluble in a solvent.

2. The hydraulic fracking plug assembly of claim 1, wherein the upper and lower backup rings comprise magnesium or a magnesium alloy.

3. The hydraulic fracking plug assembly of claim 1, wherein the upper and lower backup rings have a substantially triangular cross-section, and wherein two sides of the triangle facing the mandrel form an angle of 50-130 degrees.

4. The hydraulic fracking plug assembly of claim 3, wherein cone surfaces and element surfaces adjacent to the backup rings are angled to mate flat with the two sides of the backup ring facing the mandrel.

5. The hydraulic fracking plug assembly of claim 1, wherein the solvent is potassium chloride.

6. The hydraulic fracking plug assembly of claim 1, wherein the solvent is an acid or is a base.

7. The hydraulic fracking plug assembly of claim 1, wherein at least one of upper and lower backup rings are soluble in the solvent.

8. The hydraulic fracking plug assembly of claim 1, wherein the sealing element is soluble in the solvent.

9. The hydraulic fracking plug assembly of claim 8, wherein the sealing element comprises a soluble rubber compound.

10. The hydraulic fracking plug assembly of claim 1, wherein the mandrel is soluble in the solvent.

11. The hydraulic fracking plug assembly of claim 10, wherein the mandrel comprises magnesium or a magnesium alloy.

12. The hydraulic fracking plug assembly of claim 10, wherein the mandrel further comprises one or more holes or grooves configured to increase a surface area of the mandrel to facilitate dissolving the mandrel in the solvent.

13. The hydraulic fracking plug assembly of claim 1, wherein at least part of at least one of the upper and lower slip are soluble in the solvent.

14. The hydraulic fracking plug assembly of claim 1, wherein at least one of the upper slip, lower slip, and slip teeth are soluble in the solvent.

15. The hydraulic fracking plug assembly of claim 1, wherein the mandrel further comprises a ball seat at one end of the inner surface of the mandrel, the ball seat configured to seal against a ball.

16. The hydraulic fracking plug assembly of claim 15, wherein the ball is soluble in the solvent.

17. The hydraulic fracking plug assembly of claim 15, wherein the ball contains the solvent.

18. The hydraulic fracking plug assembly of claim 1, wherein the mandrel is a polymer.

19. The hydraulic fracking plug assembly of claim 18, wherein the mandrel polymer is soluble in the solvent.

20. The hydraulic fracking plug assembly of claim 1, wherein the plug assembly is configured to be used in plug-and-perf fracking.

21. The hydraulic fracking plug assembly as in claim 1 wherein the cavity plug capping the cavity in the shoe is formed from a material soluble in a selected solvent.

22. The hydraulic fracking plug assembly as in claim 1 wherein the cavity in the shoe capped by the cavity plug is left empty and the cavity plug capping the cavity in the shoe is configured to quickly give way when exposed to a selected solvent thereby increasing a surface area of the shoe exposed to the solvent.

23. The hydraulic fracking plug assembly as in claim 1 wherein the cavity is filled with a solvent.

24. The hydraulic fracking plug assembly as in claim 1 wherein the cavity is filled with a solvent and capped with the cavity plug just prior to installation of the hydraulic fracking plug assembly in a well casing.

25. A hydraulic fracking plug assembly, comprising:
a mandrel comprising a body having an outer cylindrical surface and an inner surface, the inner surface forming an opening in the mandrel body approximately parallel to an axis of the outer cylindrical surface, the mandrel having an axis in the direction of the outer cylindrical surface's axis;
a sealing element comprising a flexible material having a cylindrical inner surface, installed along the outer cylindrical surface of the mandrel, and configured to seal the mandrel against a casing when force is applied to the sealing element in the direction of the mandrel's axis;
an upper compression assembly and a lower compression assembly each installed along the outer cylindrical surface of the mandrel such that the upper compression assembly is in contact with an upper surface of the sealing element and the lower compression assembly is in contact with a lower surface of the sealing element;
a shoe configured to capture the sealing element, the upper compression assembly and the lower compression assembly on the mandrel, the shoe having a cavity formed therein and capped with a cavity plug;
wherein the shoe and one or more of the mandrel, a portion of the upper compression assembly and a portion of the lower compression assembly are soluble in a solvent.

26. The hydraulic fracking plug assembly as in claim 25 wherein the cavity plug capping the cavity in the shoe is formed from a material soluble in a selected solvent.

27. The hydraulic fracking plug assembly as in claim 25 wherein the cavity in the shoe capped by the cavity plug is left empty and the cavity plug capping the cavity in the shoe is configured to quickly give way when exposed to a selected solvent thereby increasing a surface area of the shoe exposed to the solvent.

28. The hydraulic fracking plug assembly as in claim 25 wherein the cavity is filled with a solvent.

29. The hydraulic fracking plug assembly as in claim 25 wherein the cavity is filled with a solvent and capped with the cavity plug just prior to installation of the hydraulic fracking plug assembly in a well casing.

\* \* \* \* \*